United States Patent
Au et al.

(10) Patent No.: US 6,519,108 B2
(45) Date of Patent: *Feb. 11, 2003

(54) METHOD AND APPARATUS FOR TESTING MR HEAD INSTABILITY USING A CRITERION THAT REMOVES NORMAL HEAD FLUCTUATION FROM CONSIDERATION

(75) Inventors: Hoan Andrew Au, Palo Alto, CA (US); Weining Zeng, Cupertino, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/452,651

(22) Filed: Dec. 1, 1999

(65) Prior Publication Data

US 2003/0002199 A1 Jan. 2, 2003

(51) Int. Cl.$^7$ .............................................. G11B 5/596
(52) U.S. Cl. ................... 360/77.04; 714/745; 714/819; 324/212
(58) Field of Search .......................... 714/47, 48, 736, 714/737, 745, 819; 360/46, 51, 53, 31, 77.04; 324/212

(56) References Cited

U.S. PATENT DOCUMENTS

| | | | |
|---|---|---|---|
| 5,650,887 A | | 7/1997 | Dovek et al. |
| 5,825,744 A | * | 10/1998 | Hutchins et al. .............. 360/46 |
| 5,886,842 A | * | 3/1999 | Ziperovich ................... 360/51 |
| 5,892,632 A | | 4/1999 | Behrens et al. |
| 6,104,188 A | * | 8/2000 | Coker et al. ................ 324/212 |
| 6,141,175 A | * | 10/2000 | Nazarian et al. ......... 360/77.04 |

* cited by examiner

Primary Examiner—Albert Decady
Assistant Examiner—Matthew Dooley
(74) Attorney, Agent, or Firm—Altera Law Group, LLC

(57) ABSTRACT

A method and apparatus for detecting disk drive head instability. Normal head fluctuation is removed from the criterion used to detect whether a head is unstable. The present invention accumulates error signals in an accumulator and calculates a criterion having an average fluctuation removed using the accumulated error signals. The criterion is calculated according to (max+min)−(2×average), wherein max is the maximum error signal, min is the minimum error signal and average is the average error signal. The criterion is then compared to a predetermine threshold to determine whether the head is unstable. A head is determined to be unstable when (max+min)−(2×average) is greater than the predetermined threshold.

18 Claims, 6 Drawing Sheets

METHOD AND APPARATUS FOR TESTING MR HEAD INSTABILITY USING A CRITERION THAT REMOVES NORMAL HEAD FLUCTUATION FROM CONSIDERATION

BACKGROUND OF THE INVENTION

1. Field of the Invention

This invention relates in general to a disk drive testing, and more particularly to a method and apparatus for testing head instability using a criterion that removes normal head fluctuation from consideration.

2. Description of Related Art

Computer manufacturers have always worked to squeeze more data into smaller spaces. That mission has produced competing and complementary data storage technology including electronic circuits, magnetic media like hard disks and tape, and optical media such as compact disks. Today, companies constantly push the limits of these technologies to improve their speed, reliability, and throughput all while reducing cost. Storage technology has come a long way, and manufacturers continue to improve its speed, reliability, and throughput. Hard disks are the most common type of mass storage device today thanks to their low cost, high speed, and relatively high storage capacity.

Most hard disk manufacturers today are concerned about system reliability. Further, computer users today have great expectations concerning the reliability of their data storage systems. Even though continual improvements in technology make data loss uncommon, it is not impossible. Yet, improvements in failure detection methods have led to steady increases in the mean time between failures (MTBF).

Of particular importance to increasing the MTBF is the focus on actively monitoring disk drive characteristics. For example, magnetic heads are commonly employed for the tasks of interacting with magnetic media for information storage and retrieval. A magnetic head includes an inductive coil disposed between a pair of magnetic poles. During the data writing mode, the current carrying coil induces magnetic flux into the magnetic poles, which in turn magnetizes a moving recording medium positioned close to the magnetic head. During the data reading mode, an MR read element utilizes the MR effect to detect magnetic flux emanating from the magnetic recording medium.

The MR head uses a thin film layer of ferromagnetic material to provide a high reading output irrespective of the relative speed between the head assembly and the magnetic recording medium. However, there is a possibility of producing a defective MR read element which can result in instability.

In a hard disk drive assembly (HDA), a general error measurement (GEM) circuit has been used in the read channel. The GEM subsystem samples raw data and stores measurement information, which may be processed or examined by the disk controller at a later time. In general, the input to the GEM subsystem is the difference between an actual sample and an estimated ideal sample. This difference may be squared and accumulated.

In prior GEM subsystems, a test failure criterion is used to detect MR head instability at the drive level. This test failure criterion is based upon the mean squared error (MSE) range. The MSE is defined as the maximum minus the minimum of the MSE readings of N times. When this range is larger than a predetermined threshold, then head is determined to be too unstable and is therefore identified as a failed device. Those skilled in the art will recognize that MR head is used generically here, and accordingly, MR head may refer to any type of MR head, e.g., anisotropic magneto-resistive (AMR) head or a giant magneto-resistive head (GMR).

The MSE range can vary even for stable heads because the MSE is always positive and its value varies over a range for different heads. Thus, normal random fluctuation of the GEM results can result in the miss-fire of the test thereby identifying a stable MR head as an unstable head. This causes a yield hit to the manufacturing of the MR heads that is higher than necessary.

It can be seen that there is a need for a method and apparatus for testing head instability using a criterion that removes normal head fluctuation from consideration.

SUMMARY OF THE INVENTION

To overcome the limitations in the prior art described above, and to overcome other limitations that will become apparent upon reading and understanding the present specification, the present invention discloses a method and apparatus for detecting disk drive head instability.

The present invention solves the above-described problems by providing removing normal head fluctuation from the criterion used to detect whether a head is unstable.

A method and apparatus in accordance with the principles of the present invention accumulates error signals in an accumulator, calculates a criterion having an average fluctuation removed using the accumulated error signals and compares the criterion to a predetermine threshold to determine whether the head is unstable.

Other embodiments of a method and apparatus in accordance with the principles of the invention may include alternative or optional additional aspects. One such aspect of the present invention is that the calculation of the criterion further includes determining a maximum error signal, determining a minimum error signal, determining an average error signal and computing the criterion according to:

$$(\text{max}+\text{min})-(2\times\text{average}),$$

wherein max is the maximum error signal, min is the minimum error signal and average is the average error signal.

Another aspect of the present invention is that the comparing further includes comparing the criterion computed according to (max+min)−(2×average) to the predetermine threshold and determining that the head is unstable when (max+min)−(2×average) is greater than the predetermined threshold.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for testing head instability using a criterion that removes normal head fluctuation from consideration. Thus, normal random fluctuation of the GEM results will not result in the miss-fire of the test to identify a stable MR head as an unstable head. Accordingly, the MR head instability test is more robust and the hit to the manufacturing of the MR heads that is not higher than necessary.

Figure 1:
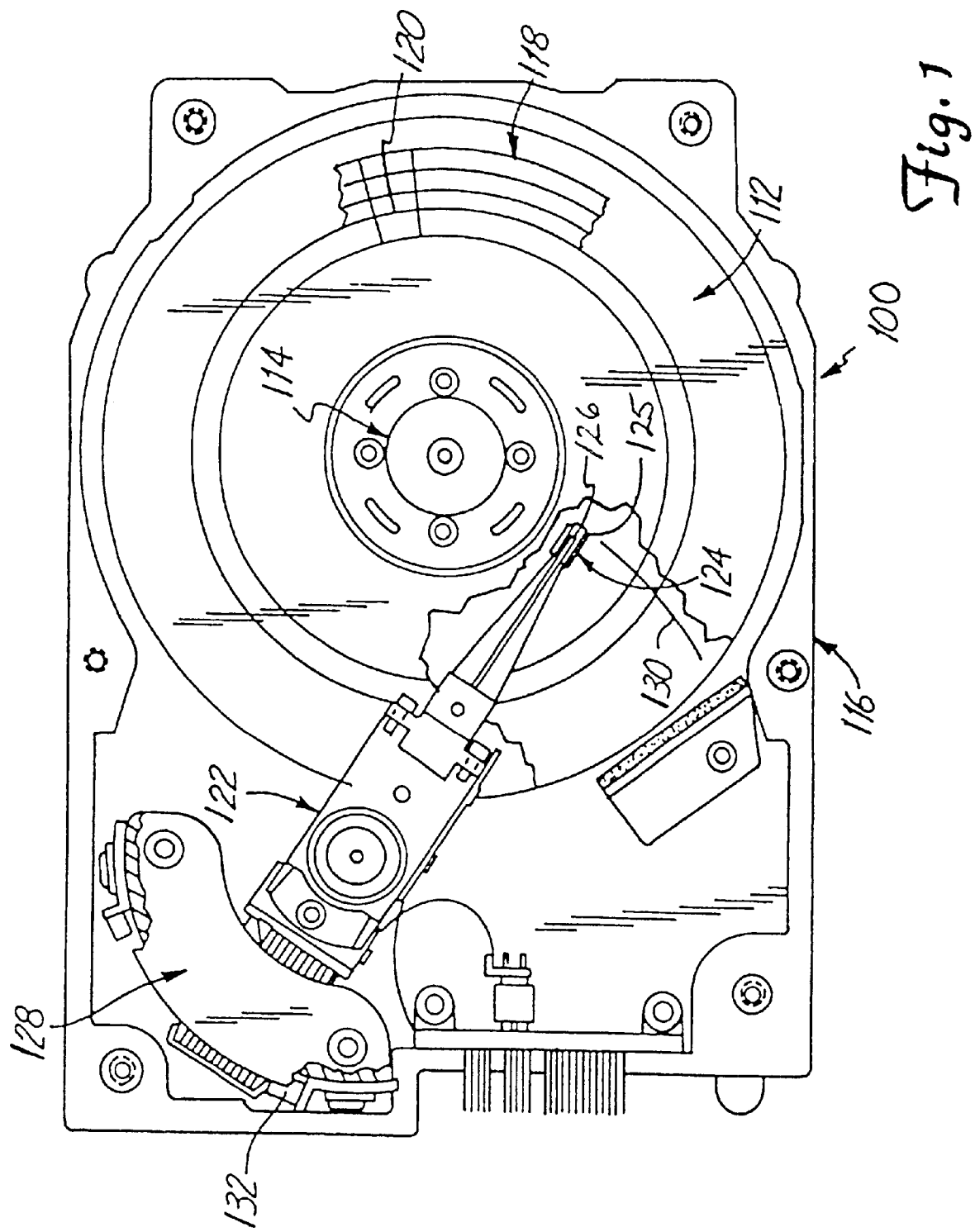
FIG. 1 illustrates a rotary magnetic disk drive system suitable for incorporating the teachings of the present invention

FIG. 1 illustrates a rotary magnetic disk drive system 100 suitable for incorporating the teachings of the present invention. In FIG. 1, a plurality of magnetic information storage disks 112 are journaled about a spindle motor assembly 114 within a housing 116. Each magnetic disk 112 has a multiplicity of concentric circular recording tracks 118, which are subdivided into sectors 120. Data can be stored on or retrieved from the disks 112 by referencing a specific track 118 and sector 120.

An actuator arm assembly 122 is rotatably mounted preferably in one corner of the housing 116. The actuator arm assembly 122 carries a plurality of head gimbal assemblies 124. Each of the head gimbal assemblies 124 carry a slider 125 having a read/write head, or transducer 126 for reading information from and writing information onto the magnetic disks 112. Transducer 126 may, for example, include a thin film head, an MR head or a GMR head.

A voice coil motor 128 is adapted to precisely rotate the actuator arm assembly 122 back and forth such that the transducers 126 move across the magnetic disks 112 along an arc 130. The disk drive system 100 also includes control circuitry 132 for processing information to be written to or received from the disks 112 and controlling the position of the transducers 126. For example, the control circuitry may include a read-channel as illustrated in FIG. 2.

Figure 2:
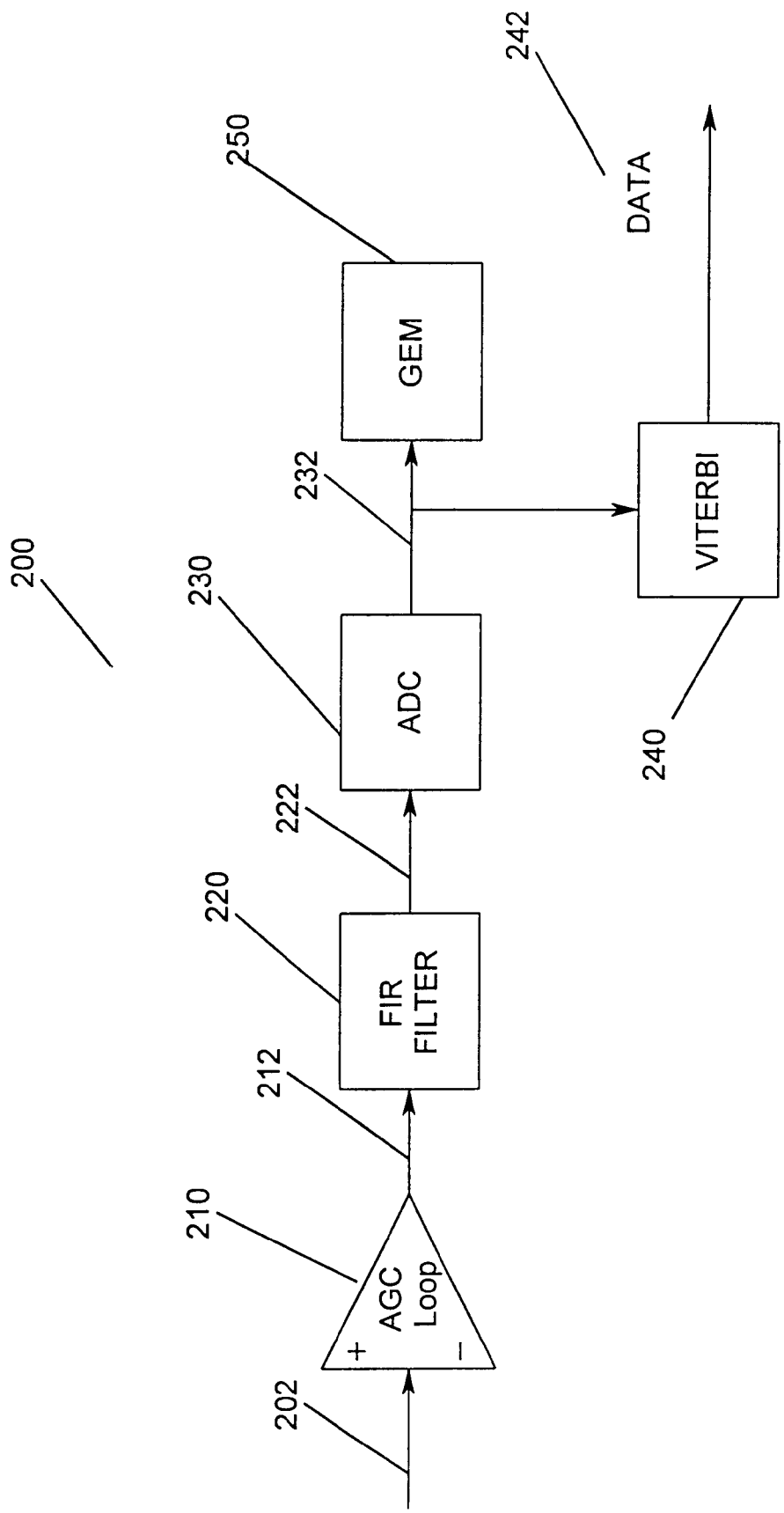
FIG. 2 illustrates a block diagram of a read channel according to the present invention.

FIG. 2 illustrates a block diagram of a read channel 200 according to the present invention. In FIG. 2, the read signal 202 is received by the automatic gain control (AGC) loop 210. The amplified signal 212 is filtered by a FIR filter 220 to equalize the read channel's 200 frequency response to the proper partial response shape. The equalized signal 222 is then converted to a digital signal 232 by the analog-to-digital converter 230. The digital signal 232 is then processed by the Viterbi decoder 240 to reconstruct the original bit sequence written to the disk with a minimum probability of error as the data output 242 of the read channel 200.

A GEM circuit 250 receives the equalized digital signal 232 and monitors head instability. The GEM circuit 250 is configured to monitor the estimate error of the read-back signal 232. According to the present invention, the estimated error of the read-back signal 232 is accumulated at the GEM circuit 250 so that head instability can be detected according to:

(max+min)−(2×average)>threshold.

Figure 3:
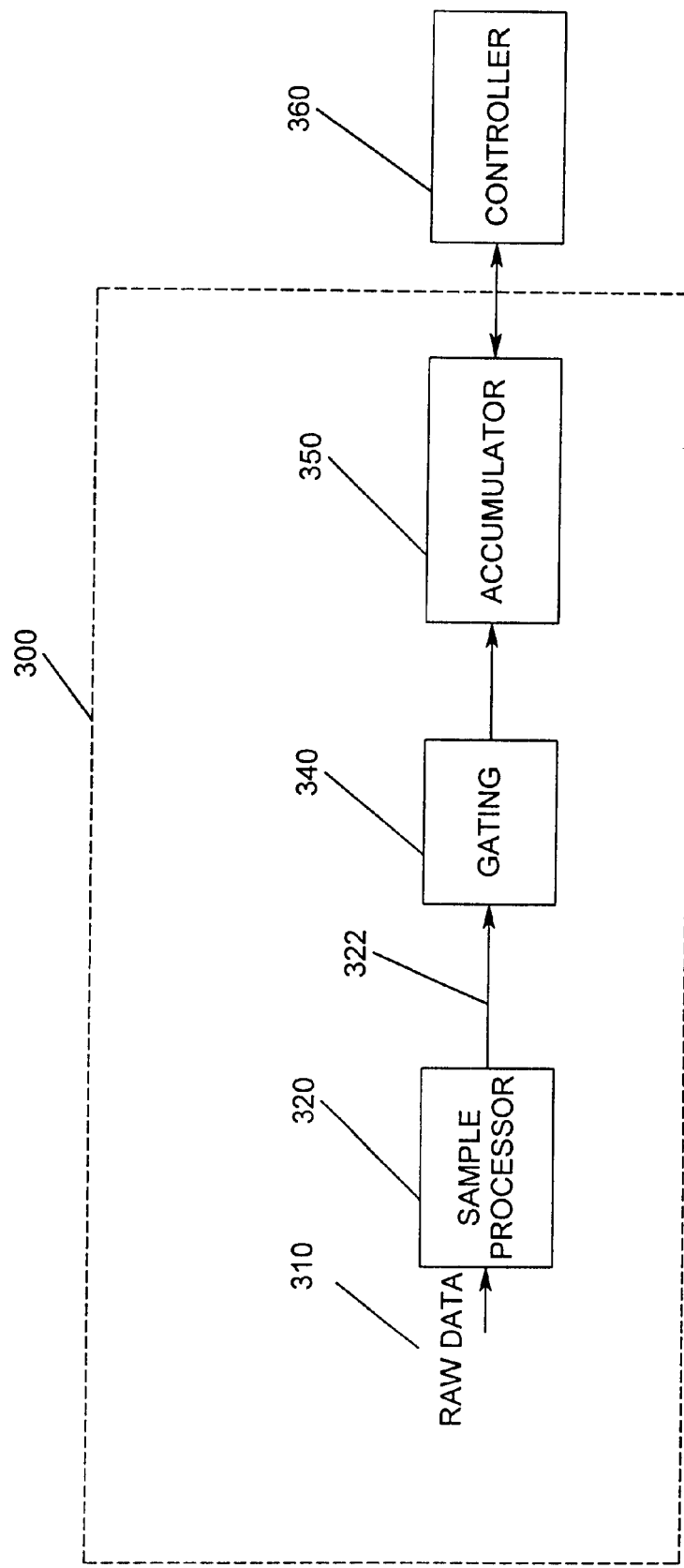
FIG. 3 illustrates a block diagram of a GEM circuit according to the present invention.

FIG. 3 illustrates a block diagram of a GEM circuit 300 according to the present invention. In FIG. 3, the raw data 310, i.e., the equalized digital signals, are received by the sample processor 320. The sample processor 320 processes the raw data 310. The processed samples 322 are gated 340 and accumulated 350.

Those skilled in the art will recognize that the present invention is not meant to be limited to any particular sample processing or gating. For example, the gating may be implemented with the capability to select a GEM window, a sample type, e.g., +1, −1, 0, all, etc. Furthermore, the sample processing may be configured to perform any type of sample processing such as filtering the error signal, producing an scaled error signal, producing the square of the error signal, etc.

A controller 360 accesses the accumulator 350 to obtain the maximum estimated error signal, the minimum estimated error signal and the average of the estimated error signal over a predetermined period of time or over a number of samples. The controller 360 can then quantify the head instability according to whether (max+min)−(2×average) >threshold.

Figure 4:
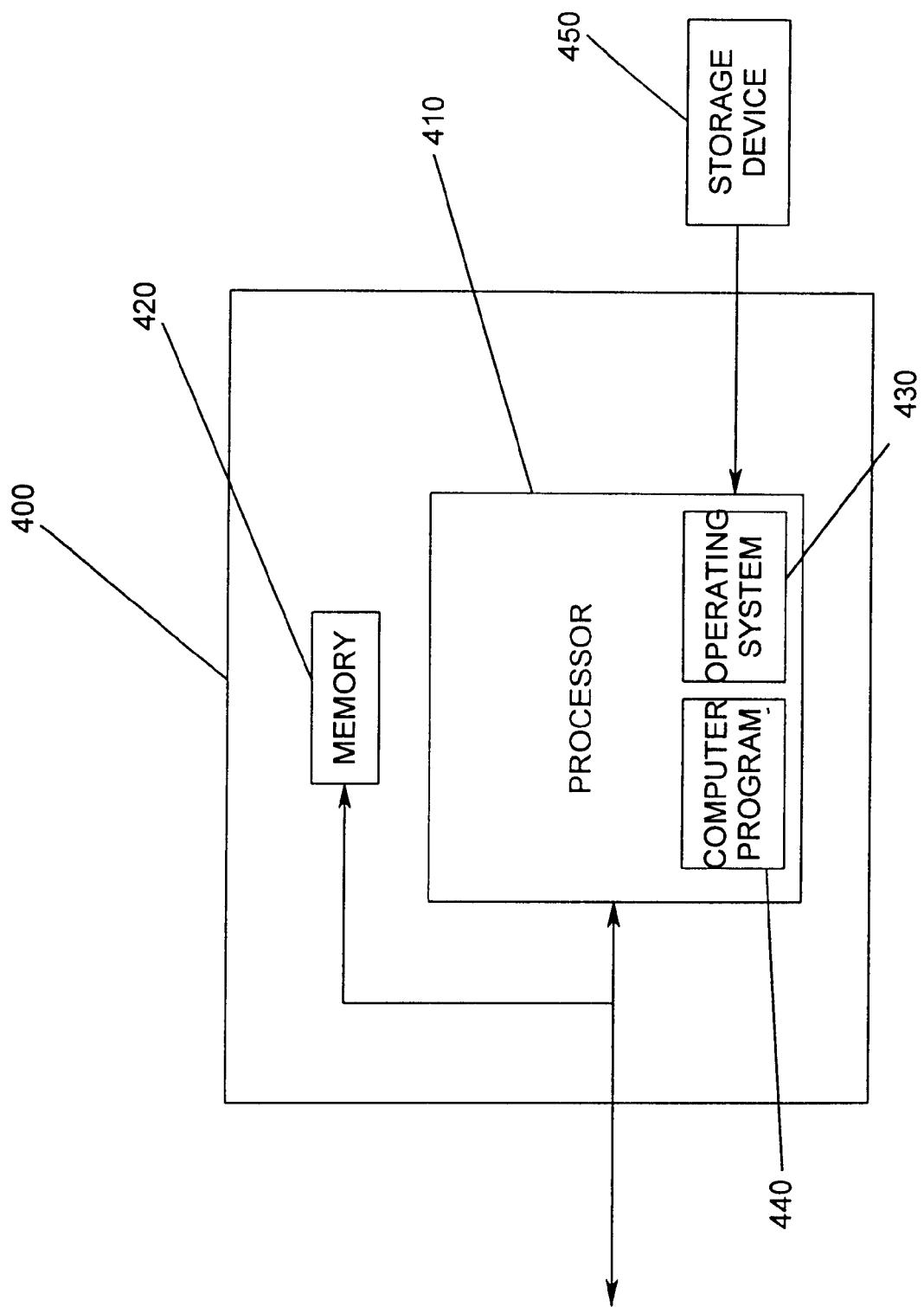
FIG. 4 is a block diagram of an exemplary hardware environment for detecting and quantifying head instability according to the present invention.

FIG. 4 is a block diagram 400 of an exemplary hardware environment for detecting and quantifying head instability according to the present invention. The present invention is typically implemented using a computer 410 comprised of a microprocessor. Memory 420 is provided for storing data accessed from an accumulator for processing by the computer 410. The computer 410 operates under the control of an operating system 430. The computer 410 executes one or more computer programs 440, under the control of the operating system 430.

Generally, the operating system 430 and the computer programs 440 may be tangibly embodied in a computer-readable medium or carrier, e.g. one or more of the fixed and/or removable data storage device 450, or other data storage or data communications devices. Both the operating system 430 and the computer programs 440 may be loaded from the data storage device 450 into the computer 410 for execution as discussed below with reference to FIG. 4. Both the operating system 430 and the computer programs 440 comprise instructions which, when read and executed by the microprocessor of the computer 410, causes the computer 410 to perform the steps necessary to execute the steps or elements of the present invention.

Although an exemplary computer system configuration is illustrated in FIG. 4, those skilled in the art will recognize that any number of different configurations performing similar functions may be used in accordance with the present invention.

Figure 5:
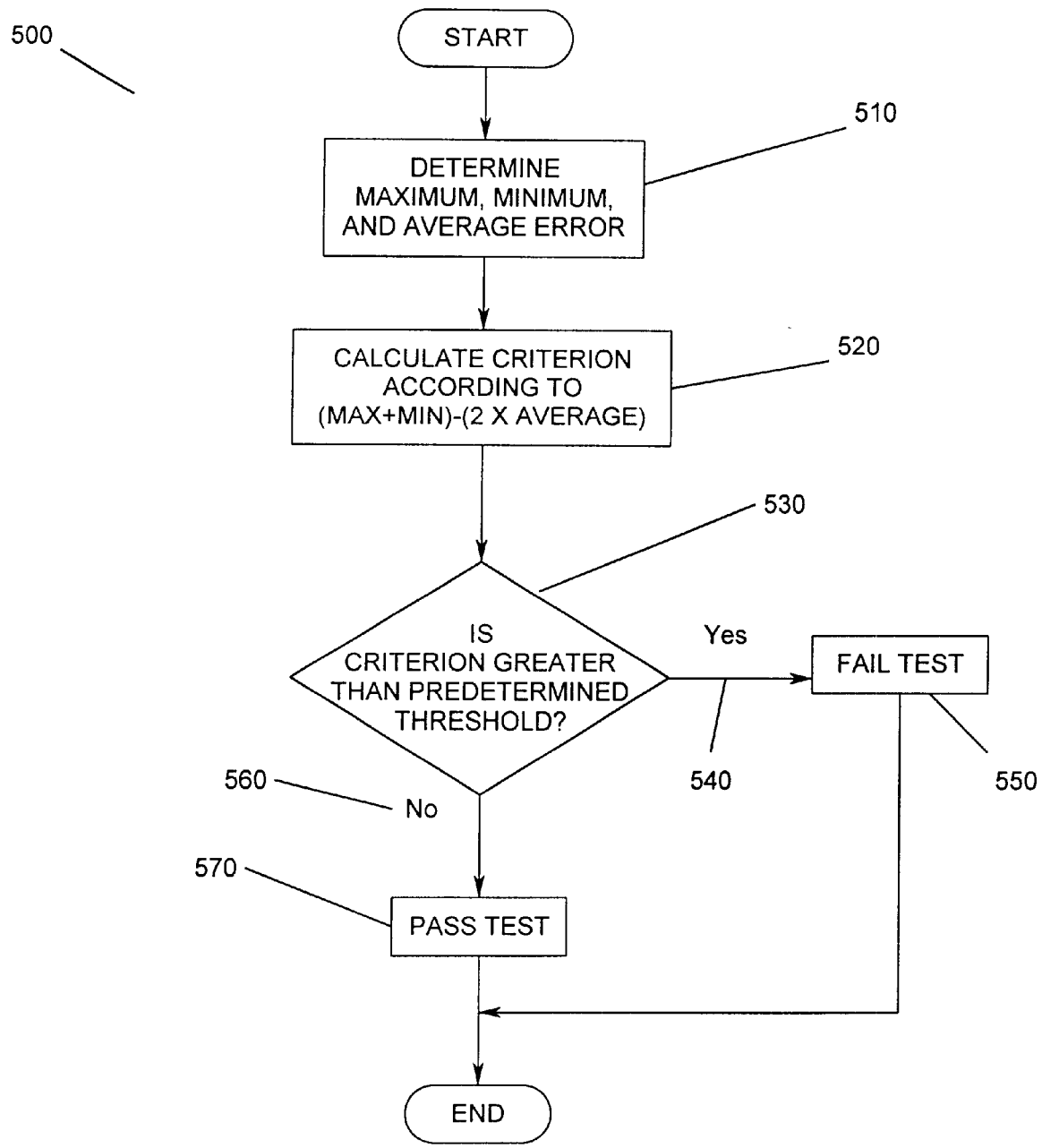
FIG. 5 illustrates a flow chart of the method for testing head instability using a criterion that removes normal head fluctuation from consideration according to the present invention.

FIG. 5 illustrates a flow chart 500 of the method for testing head instability using a criterion that removes normal head fluctuation from consideration according to the present invention. First, the minimum estimated error signal, the maximum estimated error signal and the average of the estimated error signal over a predetermined period of time or over a number of samples are determined 510. The criterion (max+min)−(2×average) is then calculated 520. A decision is made as to whether the calculated criterion is greater than a predetermined threshold 530. If the criterion is greater than a predetermined threshold 540, then the head fails the test 550. If the criterion is not greater than a predetermined threshold 560, the head passes the test 570.

Figure 6:
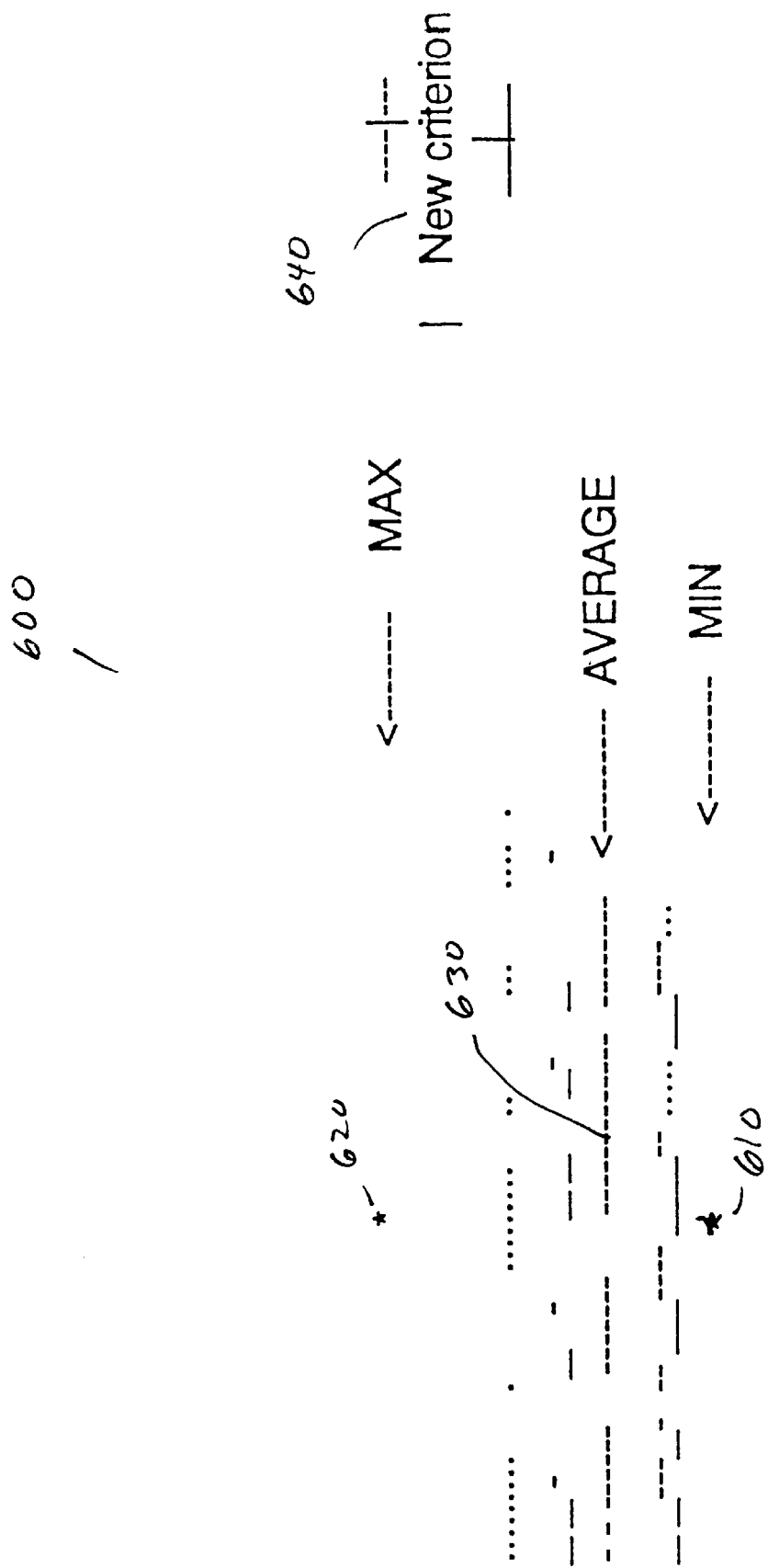
FIG. 6 illustrates a plot of estimated error samples.

FIG. 6 illustrates a plot of estimated error samples. In FIG. 6, a minimum 610 and a maximum 620 estimated error sample are shown. From all of the samples, an average 630 is calculated. The maximum and minimum are added and twice the average is subtracted from the sum. The result is a new criterion 640. If the new criterion 640 is greater than a predetermined threshold, then the test according to the present invention declares that the head fails the test.

In the prior methods, the mean square error (MSE) range, i.e., the difference between the maximum 620 and the minimum 610, was compared against a criterion. However, because the MSE was always positive and its value varied significantly for different heads, the MSE range itself fluctuates. But, by subtracting out the normal fluctuation included in the average 630, normal fluctuations may be could removed from consideration in determining whether the head was unstable.

In addition, because the normal fluctuation about an average 630 is equal, and the method according to the present invention will provide a new criterion 640 that is approximately equal to zero. The new threshold can therefore be much less than the threshold previously used because the measurement randomness has already been subtracted out. Accordingly, the change due to the randomness of measurement is separated from the randomness created by the head instability.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for testing head instability, comprising:
   accumulating general error measurement signals in an accumulator;
   calculating a criterion having an average general error measurement signal fluctuation removed using the accumulated general error measurement signals; and
   comparing the calculated criterion to a predetermine threshold for identifying unstable heads during manufacturing so that manufacturing yield is improved.

2. The method of claim 1 wherein the calculating further comprises:
   determining a maximum general error measurement signal;
   determining a minimum general error measurement signal;
   determining an average general error measurement signal; and
   computing the calculated criterion according to:

(max+min)−(2×average), wherein max is the maximum general error measurement signal, min is the minimum general error measurement signal and average is the average general error measurement signal.

3. The method of claim 2 wherein the comparing further comprises:
   comparing the calculated criterion computed according to (max+min)−(2×average) to the predetermine threshold; and
   determining that the head is unstable when (max+min)−(2×average) is greater than the predetermined threshold.

4. A system for detecting head instability, comprising:
   an accumulator for accumulating general error measurement signals; and
   a controller, coupled to the accumulator, for accessing the accumulated general error measurement signals, calculating a criterion having an average general error measurement fluctuation removed and comparing the calculated criterion to a predetermine threshold for identifying unstable heads during manufacturing so that manufacturing yield is improved.

5. The system of claim 4 wherein the controller calculates the criterion by determining a maximum general error measurement signal, a minimum general error measurement signal, and an average general error measurement signal and computing the calculated criterion according to:

(max+min)−(2×average), wherein max is the maximum general error measurement signal, min is the minimum general error measurement signal and average is the average general error measurement signal.

6. The system of claim 5 wherein the controller compares the calculated criterion by comparing a criterion having an average general error measurement signal fluctuation removed computed according to (max+min)−(2×average) to the predetermine threshold and determining that the head is unstable when (max+min)−(2×average) is greater than the predetermined threshold.

7. The system of claim 4 further comprising:
   a sample processor for processing raw error data signals to produce processed error signals; and
   a gate, coupled to the sample processor, for gating the processed error signals to produce the general error measurement signals for accumulation by the accumulator.

8. A read channel, comprising:
   an automatic gain control (AGC) loop for providing read-back signals at a proper amplitude;
   a FIR filter, coupled to the AGC loop, for producing equalized signals in response to the read-back signals, the equalized signals being equalized to have a frequency response corresponding to a predetermined partial response shape;
   an analog-to-digital converter, coupled to the FIR filter, for converting the equalized analog signals to digital signals representing error signals;
   a Viterbi decoder, coupled to the analog-to-digital converter, for processing the error signals to reconstruct an original bit sequence written to the disk with a minimum probability of error as data output of the read channel; and
   a system, coupled to the analog-to-digital converter, for detecting head instability, the system further comprising:
      an accumulator for accumulating general error measurement signals; and a controller, coupled to the accumulator, for accessing the accumulated general error measurement signals, calculating a criterion having an average general error measurement signal fluctuation removed and comparing the calculated criterion to a predetermine threshold for identifying unstable heads during manufacturing so that manufacturing yield is improved.

9. The read channel of claim 8 wherein the controller calculates the criterion by determining a maximum general error measurement signal, a minimum general error measurement signal, and an average general error measurement signal and computing the calculated criterion according to:

$$(\text{max}+\text{min})-(2\times\text{average}),$$

wherein max is the maximum general error measurement signal, min is the minimum general error measurement signal and average is the average general error measurement signal.

10. The read channel of claim 9 wherein the controller compares the criterion by comparing a calculated criterion computed according to (max+min)−(2×average) to the predetermine threshold and determining that the head is unstable when (max+min)−(2×average) is greater than the predetermined threshold.

11. The read channel of claim 8 further comprising:
a sample processor for processing raw error data signals to produce processed error signals; and
a gate, coupled to the sample processor, for gating the processed error signals to produce the general error measurement signals for accumulation by the accumulator.

12. A disk drive, comprising;
at least one magnetic information storage disk;
a spindle motor assembly, coupled to the at least one magnetic information storage disk, for rotating at least one the magnetic information storage disk;
an actuator arm assembly including at least one head gimbal assembly, wherein the at least one head gimbal assembly has a slider with a read/write head coupled thereto for reading information from and writing information onto the at least one magnetic information storage disk;
a voice coil motor, coupled to the actuator arm assembly, for rotating the actuator arm assembly to move across the at least one magnetic information storage disk; and
a read channel, electrically coupled to the read/write head, for processing information read from the at least one magnetic information storage disk, wherein the read channel further comprises:
an automatic gain control (AGC) loop for providing read-back signals at a proper amplitude;
a FIR filter, coupled to the AGC loop, for producing equalized signals in response to the read-back signals, the equalized signals being equalized to have a frequency response corresponding to a predetermined partial response shape;
an analog-to-digital converter, coupled to the FIR filter, for converted the equalized analog signals to digital signals represent error signals;
a Viterbi decoder, coupled to the analog-to-digital converter, for processing the error signals to reconstruct an original bit sequence written to the disk with a minimum probability of error as data output of the read channel; and a system, coupled to the analog-to-digital converter, for detecting head instability, the system further comprising:
an accumulator for accumulating general error measurement signals; and
a controller, coupled to the accumulator, for accessing the accumulated general error measurement signals, calculating a criterion having an average general error measurement signal fluctuation removed and comparing the calculated criterion to a predetermine threshold for identifying unstable heads during manufacturing so that manufacturing yield is improved.

13. The disk drive of claim 12 wherein the controller calculates the criterion by determining a maximum general error measurement signal, a minimum general error measurement signal; and an average general error measurement signal and computing the calculated criterion according to:

$$(\text{max}+\text{min})-(2\times\text{average}),$$

wherein max is the maximum general error measurement signal, min is the minimum general error measurement signal and average is the average general error measurement signal.

14. The disk drive of claim 13 wherein the controller compares the criterion by comparing a calculated criterion computed according to (max+min)−(2×average) to the predetermine threshold and determining that the head is unstable when (max+min)−(2×average) is greater than the predetermined threshold.

15. The disk drive of claim 12 further comprising:
a sample processor for processing raw error data signals to produce processed error signals; and
a gate, coupled to the sample processor, for gating the processed error signals to produce the general error measurement signals for accumulation by the accumulator.

16. An article of manufacture comprising a program storage medium readable by a computer, the medium tangibly embodying one or more programs of instructions executable by the computer to perform a method for testing head instability, the method comprising:
accumulating general error measurement signals in an accumulator;
calculating a criterion having an average general error measurement signal fluctuation removed using the accumulated general error measurement signals; and
comparing the calculated criterion to a predetermine threshold for identifying unstable heads during manufacturing so that manufacturing yield is improved.

17. The article of manufacture of claim 16 wherein the calculating further comprises:
determining a maximum general error measurement signal;
determining a minimum general error measurement signal;
determining an average general error measurement signal; and
computing the calculated criterion according to:

$$(\text{max}+\text{min})-(2\times\text{average}),$$

wherein max is the maximum general error measurement signal, min is the minimum general error measurement signal and average is the average general error measurement signal.

18. The article of manufacture of claim 17 wherein the comparing further comprises:

comparing the calculated criterion computed according to (max+min)−(2×average) to the predetermine threshold; and determining that the head is unstable when (max+min)−(2×average) is greater than the predetermined threshold.

* * * * *